United States Patent
Kamura et al.

[11] Patent Number: 5,878,711
[45] Date of Patent: Mar. 9, 1999

[54] CONTROL APPARATUS FOR A CYLINDER-INJECTION SPARK-IGNITION INTERNAL COMBUSTION ENGINE

[75] Inventors: Hitoshi Kamura; Kenjiro Hatayama, both of Kyoto; Hiroki Tamura, Hoi-gun; Atsuyoshi Kojima, Toyota, all of Japan

[73] Assignee: Mitsubishi Jidosha Kogyo Kabushiki Kaisha, Tokyo, Japan

[21] Appl. No.: 915,797

[22] Filed: Aug. 21, 1997

[30] Foreign Application Priority Data

Aug. 27, 1996 [JP] Japan .................................. 8-225722

[51] Int. Cl.[6] .............................. F02B 23/10; F02D 41/16
[52] U.S. Cl. ...................... 123/295; 123/305; 123/339.16
[58] Field of Search ...................... 123/295, 305, 123/339.12, 339.16, 339.23

[56] References Cited

U.S. PATENT DOCUMENTS

| | | | |
|---|---|---|---|
| 5,031,594 | 7/1991 | Morikawa | 123/295 |
| 5,095,873 | 3/1992 | Motoyama et al. | 123/305 |
| 5,628,290 | 5/1997 | Iida et al. | 123/305 |

*Primary Examiner*—Tony M. Argenbright

[57] ABSTRACT

A control apparatus for a cylinder-injection spark-ignition internal combustion engine, having a fuel injection valve for directly injecting fuel to a combustion chamber and controlling the fuel injection valve on the basis of either an intake stroke injection mode for effecting fuel injection mainly in the intake stroke and a compression stroke injection mode for effecting fuel injection mainly in the compression stroke. A fuel injection quantity correction device corrects at least the fuel injection quantity supplied to the combustion chamber and an intake air quantity correction device corrects the intake air quantity supplied to the combustion chamber so that the preset target idle speed is reached when an idle operation state is detected. An idle speed control device controls the idle speed on the basis of each correction amount corrected by the fuel injection quantity correction device and intake air quantity correction device when an idle operation state is detected and the compression stroke injection mode is selected.

36 Claims, 7 Drawing Sheets

CONTROL APPARATUS FOR A CYLINDER-INJECTION SPARK-IGNITION INTERNAL COMBUSTION ENGINE

BACKGROUND OF THE INVENTION

1. Field of the Invention

The present invention relates to a control apparatus for controlling engine rotational speed of a cylinder-injection spark-ignition internal combustion engine capable of injecting fuel in the compression and intake strokes.

2. Description of the Related Art

In order to reduce harmful exhaust gas components or improve fuel efficiency in a spark-ignition internal combustion engine mounted on a vehicle, there have recently been proposed various types of cylinder-injection gasoline engines, in which fuel is injected directly into the combustion chamber, in place of conventional manifold-injection engines.

A cylinder-injection gasoline engine is designed so that an air-fuel mixture with an air-fuel ratio near the stoichiometric air-fuel ratio is produced around a spark plug at the time of ignition, for example, by injecting the fuel from a fuel injection valve into a cavity formed on the top of a piston, thereby enabling ignition with a generally lean air-fuel ratio. Accordingly, the discharge amounts of carbon monoxide (CO) and hydrocarbon (HC) can be reduced, and the fuel efficiency during idle operation or low-load running can be improved considerably.

In a gasoline engine of this type, the fuel injection mode is switched between a compression stroke injection mode (late injection mode) and an intake stroke injection mode (early injection mode). Thereby, during low-load operation, the fuel is injected in the compression stroke, so that the air-fuel mixture with an air-fuel ratio near the stoichiometric air-fuel ratio can be formed around the spark plug or in the cavity. As a result, satisfactory ignition is enabled even with a generally lean air-fuel ratio. During medium- and high-load operation, the fuel is injected in the intake stroke, so that the air-fuel mixture with a uniform air-fuel ratio can be formed in the combustion chamber. As a result, like the manifold-injection engine, the output required in acceleration or high-speed running can be secured by burning large amounts of fuel.

In this cylinder-injection gasoline engine as well, like the conventional manifold-injection internal combustion engine, the idle speed control is carried out to maintain a stable idle speed in idle operation.

In this case, when the fuel injection mode is the intake stroke injection mode and the engine is in the idle operation state, the fuel is injected in the intake stroke, so that the idle speed control can be carried out as with the case of the manifold-injection engine.

In the case where an external load of accessories such as an air conditioner is applied or released, the engine speed Ne is decreased or increased. In the intake stroke injection mode, to prevent the decrease or increase, the intake air quantity is corrected by the opening control of an air bypass valve (ABV), which functions mainly as an idle speed controller. Further, to increase or decrease the engine output with high response, the advance angle correction or lag angle correction of ignition timing is made temporarily immediately after the application or release of external load, thereby rapidly stabilizing the idle speed.

However, in the cylinder-injection gasoline engine, in case the fuel injection mode is the compression stroke injection mode, ignition is effected when fuel spray is collected satisfactorily in the vicinity of the spark plug, thereby achieving good combustion (MBT (minimum advance for best torque) setting). When the fuel injection mode is the compression stroke injection mode and the engine is in the idle operation mode, therefore, although the correction of intake air quantity can be made, the deterioration in combustion may be caused if the correction of ignition timing is made to improve the response. Therefore, it is not preferable to make ignition timing correction for idle speed control in the compression stroke injection mode.

SUMMARY OF THE INVENTION

An object of the present invention is to provide a control apparatus for a cylinder-injection spark-ignition internal combustion engine, in which the stabilization of engine speed can always be achieved with high response in idle operation when the fuel injection mode is the compression stroke injection mode.

The above object is achieved by the control apparatus for a cylinder-injection spark-ignition internal combustion engine in accordance with the present invention. This control apparatus comprises operation state detecting means for detecting an operation state of said internal combustion engine, injection mode selecting means for selecting an intake stroke injection mode or a compression stroke injection mode in accordance with the operation state detected by said operation state detecting means, fuel injection quantity correction means for correcting at least the fuel injection quantity supplied to a combustion chamber so that the preset target idle speed is reached when an idle operation state is detected by said operation state detecting means, intake air quantity correction means for correcting the intake air quantity supplied to the combustion chamber so that the preset target idle speed is reached when an idle operation state is detected by said operation state detecting means and idle speed control means for controlling the idle speed on the basis of each correction amount corrected by said fuel injection quantity correction means and intake air quantity correction means when an idle operation state is detected by said operation state detecting means and said compression stroke injection mode is selected by said injection mode selecting means.

Thereupon, when the fuel injection mode is the compression stroke injection mode and the engine is in an idle operation state, the idle speed is satisfactorily controlled on the basis of not only the intake air quantity correction means but also the fuel injection quantity correction means. The control response of intake air correction for correcting the intake air quantity is not so high, but on the other hand, the response of fuel correction for correcting the fuel injection quantity is very high, because of structure of the cylinder-injection spark-ignition internal combustion engine. Therefore, even when the idle speed increases or decreases suddenly, the idle speed is quickly made a proper speed by the fuel correction, so that the stabilization of idle operation can be achieved.

Preferably, the control period of the idle speed by the fuel injection quality correction means should be set so as to be a shorter period than the control period by the intake air quantity correction means. In this case, the fuel correction control for correcting the fuel injection quantity can be carried out with high response with a short period (for example, for one time of fuel injection), so that the idle speed can be made a proper speed very quickly.

Also, in the compression stroke injection mode, the fuel injection quantity correction means preferably correct the fuel injection quantity on the basis of at least one of the external load operation state established by accessories such as an air conditioner, the engine speed deviation from the target engine speed or average engine speed, and the engine speed change rate.

In the correction according to the external load operation state, the fuel injection quantity is increased or decreased a predetermined amount when an external load due to accessories such as an air conditioner is applied or released, so that a sudden decrease or increase of engine speed can be prevented, and the idle speed can quickly be made proper even if a control delay due to intake air correction is present.

In the correction according to the engine speed deviation from the target engine speed, the fuel injection quantity is increased or decreased a predetermined amount so that the engine speed deviation is decreased when it occurs, so that likewise a sudden decrease or increase of engine speed can be prevented, and the idle speed can quickly be made proper.

In the correction according to the engine speed change rate, when a small change in engine speed occurs, the fuel injection quantity is increased or decreased a predetermined amount so as to eliminate this small change, so that a further decrease or increase of engine speed can be prevented, and the idle speed can be made proper quickly at early timing.

Preferably, in the compression stroke injection mode, the fuel injection quantity correction means should correct the fuel injection quantity on the basis of the sum of correction amounts determined from the external load operation state, the engine speed deviation from the target engine speed or average engine speed, and the engine speed change rate. In this case, when an external load of accessories such as an air conditioner is applied or released, the fuel injection quantity is increased or decreased a predetermined amount by the correction according to the external load operation state. Thereupon, the fuel injection quantity is adjusted by the correction according to the engine speed deviation from the target engine speed so as to eliminate the engine speed deviation, and further adjusted by the correction according to the engine speed change rate so as to eliminate a small change in engine speed. Therefore, a sudden decrease or increase of engine speed is properly prevented, and even if a control delay due to intake air correction is present, the idle speed can be made proper very quickly without overshoot or undershoot of control.

Also, the fuel injection quantity correction means regulates the corrected fuel injection quantity corrected on the basis of the sum of correction amounts so as to be not larger than a predetermined value that does not exceed the combustion stability limit of the compression stroke injection mode. In this case, an excessively rich or lean air-fuel ratio due to the correction is regulated, so that deterioration in combustion can be prevented.

Further, the intake air quantity correction means preferably includes correction amount replacement means for setting the correction amount of the intake air quantity on the basis of the correction amount set by the fuel injection quantity correction means. In this case, during the time when the fuel correction control for correcting the fuel injection quantity is carried out, the correction amount of the intake air quantity is set on the basis of the correction amount used for the fuel correction, so that the correction amount of the intake air quantity can be set easily, and also even when the intake air correction is carried out subsequently after the fuel correction is carried out, the intake air correction can be carried out properly while keeping the idle speed having been corrected with high response by the fuel correction.

Further scope of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

One embodiment of the present invention will be described in detail with reference to the accompanying drawings.

Figure 1:
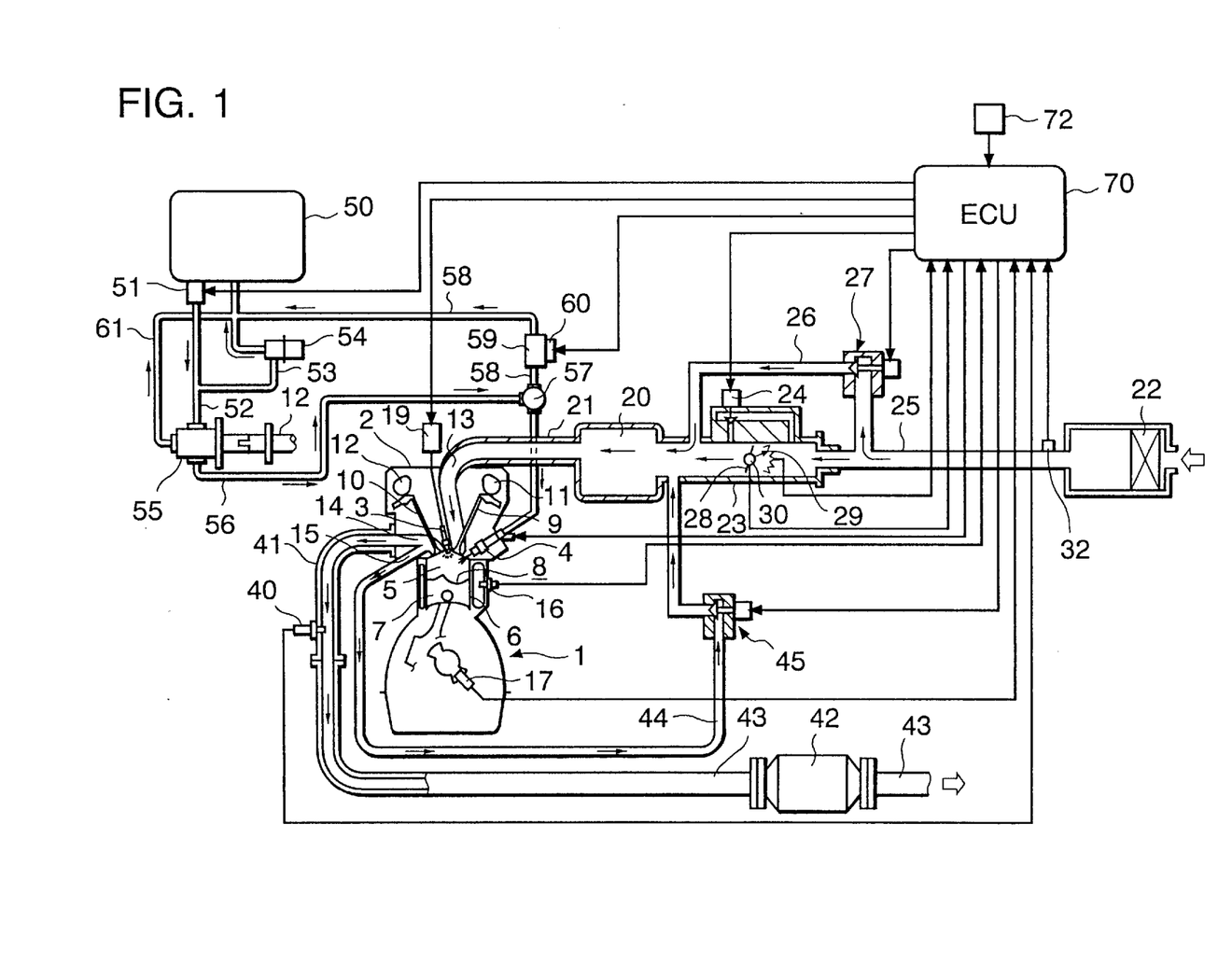
FIG. 1 is a schematic view showing a cylinder-injection spark-ignition internal combustion engine and a control apparatus therefor.

FIG. 1 is a schematic view showing one embodiment of a control apparatus for an internal combustion engine in accordance with the present invention, mounted on a vehicle.

An engine 1 is a cylinder-injection in-line 4-cylinder gasoline engine which can inject fuel in the intake stroke (early injection mode) and in the compression stroke (late injection mode) and enables combustion with a lean air-fuel ratio. In this cylinder-injection engine 1, a combustion chamber, intake system, EGR system (exhaust gas recirculation system), etc. are designed exclusively for cylinder injection, and operation with a rich air-fuel ratio, stoichiometric air-fuel ratio AFs, and lean air-fuel ratio can be performed easily.

A cylinder head 2 of the engine 1 is fitted with an solenoid-operated fuel injection valve 4 as well as a spark plug 3 for each cylinder, by which the fuel is injected directly into a combustion chamber 5. On the top of a piston 7, which is held by a cylinder 6 so as to be slidable vertically, a hemispherical cavity 8 is formed at a position which fuel spray from the fuel injection valve 4 reaches at the late stage of compression stroke. The compression ratio of the engine 1 is set so as to be higher (for example, about 12) than that of manifold-injection engine. A DOHC four-valve system is used as a valve driving train, and an intake-side camshaft 11 and exhaust-side camshaft 12 are rotatably supported at the upper part of the cylinder head 2 to drive intake and exhaust valves 9 and 10, respectively.

The cylinder head 2 is formed with intake ports 13, which extend substantially upright between the two camshafts 11 and 12. The intake air flow passing through the intake port 13 can produce a clockwise swirling flow viewed from the front in FIG. 1 (hereinafter referred to as a tumble flow) in the combustion chamber 5. On the other hand, an exhaust port 14 extends substantially in the horizontal direction as with the case of the conventional engine, and a large-diameter exhaust gas recirculation port (EGR port) 15 branches off downward slantingly.

In FIG. 1, reference numeral 16 denotes a water temperature sensor for detecting a cooling water temperature $T_W$. Reference numeral 17 denotes a vane-type crank angle sensor which generates a crank angle signal $S_{GT}$ at predetermined crank positions (for example, 5° BTDC and 75° BTDC) for each cylinder. This crank angle sensor 17 can detect the engine speed Ne on the basis of the crank angle signal $S_{GT}$ (rotational speed detecting means). Reference numeral 19 denotes an ignition coil which delivers a high voltage to the spark plug 3. Each camshaft, which rotates at half the speed of a crankshaft is provided with a cylinder discriminating sensor (not shown), which generates a cylinder discriminating signal $S_{GC}$, whereby the cylinder for which the crank angle signal $S_{GT}$ is generated is discriminated.

The intake ports 13 are connected with an intake pipe 25, which is provided with a throttle body 23, #1 ABV (a first air bypass valve) 24 of a stepper-motor type: functioning as intake air quantity correction means, an air flow sensor 32, and an air cleaner 22, through an intake manifold 21 having a surge tank 20.

The intake pipe 25 is connected in parallel with a large-diameter air bypass pipe 26 through which intake air is introduced into the intake manifold 21, bypassing the throttle body 23, and this pipe 26 is provided with large-sized #2 ABV (a second air bypass valve) 27 of a linear-solenoid type. The air bypass pipe 26 has a flow path area substantially equal to that of the intake pipe 25, so that a required quantity of intake air for a low or medium speed region of the engine 1 can be introduced when #2 ABV 27 is fully open.

The throttle body 23 is provided with a butterfly-type throttle valve 28 for opening and closing the passage, and besides, a throttle position sensor (hereinafter referred to as TPS) 29 serving as a throttle valve opening sensor for detecting a throttle opening $\theta_{th}$ and an idle switch 30 for detecting an idling state of the engine 1 by detecting a fully-closed state of the throttle valve 28 (operation state detecting means). Actually, a throttle voltage $V_{th}$ according to the throttle opening $\theta_{th}$ is delivered from the TPS 29, and the throttle opening $\theta_{th}$ is recognized on the basis of the throttle voltage $V_{th}$.

The air flow sensor 32 detects the intake air quantity Qa, and a Karman vortex type flow sensor is used as the air flow sensor 32. The intake air quantity Qa may be determined from the intake air pipe pressure detected by a boost pressure sensor installed to the surge tank 20.

On the other hand, the exhaust port 14 is connected with an exhaust pipe 43, which is provided with a three-way catalyst 42, muffler (not shown), etc., through an exhaust manifold 41, which is fitted with an $O_2$ sensor capable of detecting the actual air-fuel ratio (actual A/F). Also, the EGR port 15 is connected to the upstream side of the intake manifold 21 through a large-diameter EGR pipe 44 whose line is provided with an EGR valve 45 of a stepper-motor type.

A fuel tank 50 is set at the rear portion of a vehicle body (not shown) of the vehicle. The fuel stored in the fuel tank 50 is sucked up by means of a motor-operated low-pressure fuel pump 51, and is supplied to the engine 1 through a low-pressure feed pipe 52. The fuel pressure in the low-pressure feed pipe 52 is adjusted to a relatively low pressure (low fuel pressure) by means of a first fuel pressure regulator 54, which is inserted in a line of a return pipe 53. The fuel supplied to the engine 1 is fed to each fuel injection valve 4 through a high-pressure feed pipe 56 and a delivery pipe 57 by means of a high-pressure fuel pump 55, which is attached to the cylinder head 2.

The high-pressure fuel pump 55, which is, for example, of a swash plate axial piston type, is driven by the exhaust-side camshaft 12 or the intake-side camshaft 11, and has a oil sending ability delivering fuel pressure of 5 to 7 MPa and higher even during idle operation. The fuel pressure in the delivery pipe 57 is adjusted to a relatively high pressure (high fuel pressure) by means of a second fuel pressure regulator 59, which is inserted in a line of a return pipe 58.

In FIG. 1, reference numeral 60 denotes a solenoid-operated fuel pressure selector valve that is attached to a second fuel pressure regulator 59. This fuel pressure selector valve 60 relieves the fuel to lower the fuel pressure in the delivery pipe 57 to a low level when it is on. Further, reference numeral 61 denotes a return pipe through which a part of the fuel is returned to the fuel tank 50 after it is used to lubricate or cool the high-pressure fuel pump 55.

In a cabin of the vehicle is provided an ECU (electronic control unit) 70, which is furnished with an input-output unit, storage unit (ROM, RAM, BURAM, etc.) used to store control programs, control maps, etc., central processing unit (CPU), timer counter, etc. The ECU 70 carries out general control of the engine 1.

The input side of the ECU 70 is connected with a vehicle speed sensor 72 besides the above-mentioned various sensors to input detection information from these various sensors.

In response to the detection information, the ECU 70 settles a fuel injection mode, fuel injection quantity, ignition timing, EGR gas introduction rate, etc., and drivingly controls the fuel injection valve 4, ignition coil 19, EGR valve 45, etc. Although the explanation is omitted, besides the above-mentioned various sensors, many switches and sensors (not shown) are connected to the input side of the ECU 70, and various warning lamps and devices are connected also to the output side.

Next, the operation, that is, the outline of combustion control of the control unit of the engine 1, which is configured as described above, will be described.

If a vehicle driver turns on the ignition key when the engine is cold, the ECU 70 switches on the low-pressure fuel pump 51 and the fuel pressure selector valve 60, whereupon the fuel injection valves 4 are supplied with the fuel at a low fuel pressure.

When the driver then turns the ignition key to start operation, the engine 1 is cranked by a self starter (not shown), and at the same time, fuel injection control is initiated by the ECU 70. At this point of time, the ECU 70 selects an early injection mode (i.e., intake stroke injection mode), whereupon the fuel is injected so that the air-fuel ratio is relatively rich. This is done because a misfire or discharge of unburned fuel (HC) is unavoidable if the fuel is injected in a late injection mode (i.e., compression stroke injection mode) since the vaporization rate of the fuel is low when the engine is cold. Moreover, the ECU 70 closes #2 ABV 27 at the time of starting. In this case, therefore, the intake air is fed into the combustion chamber 5 through a gap of the throttle valve 28 or #1 ABV 24. Further, #1 ABV 24 and #2 ABV 27 are controlled unitarily by the ECU 70, and their respective openings are settled depending on the required introduction rate of the intake air (bypass air) that bypasses the throttle valve 28.

When the engine 1 starts idle operation after the starting of the engine 1 is completed, the high-pressure fuel pump 55 initiates a rated discharge operation, so that the ECU 70 turns off the fuel pressure selector valve 60 to supply the fuel at a high fuel pressure to the fuel injection valve 4. At this time, the fuel injection quantity is settled in accordance with the fuel pressure, which is detected by a fuel pressure detector (not shown) set on the delivery pipe 57 or adjusted by the second fuel pressure regulator 59, and the valve opening time of the fuel injection valve 4, that is, the fuel injection time.

Until the cooling water temperature $T_W$ reaches a predetermined value, the ECU 70 selects the early injection mode to inject the fuel so as to obtain a rich air-fuel ratio, and closes #2 ABV 27 continuously, just as at the time of the starting.

Figure 2:
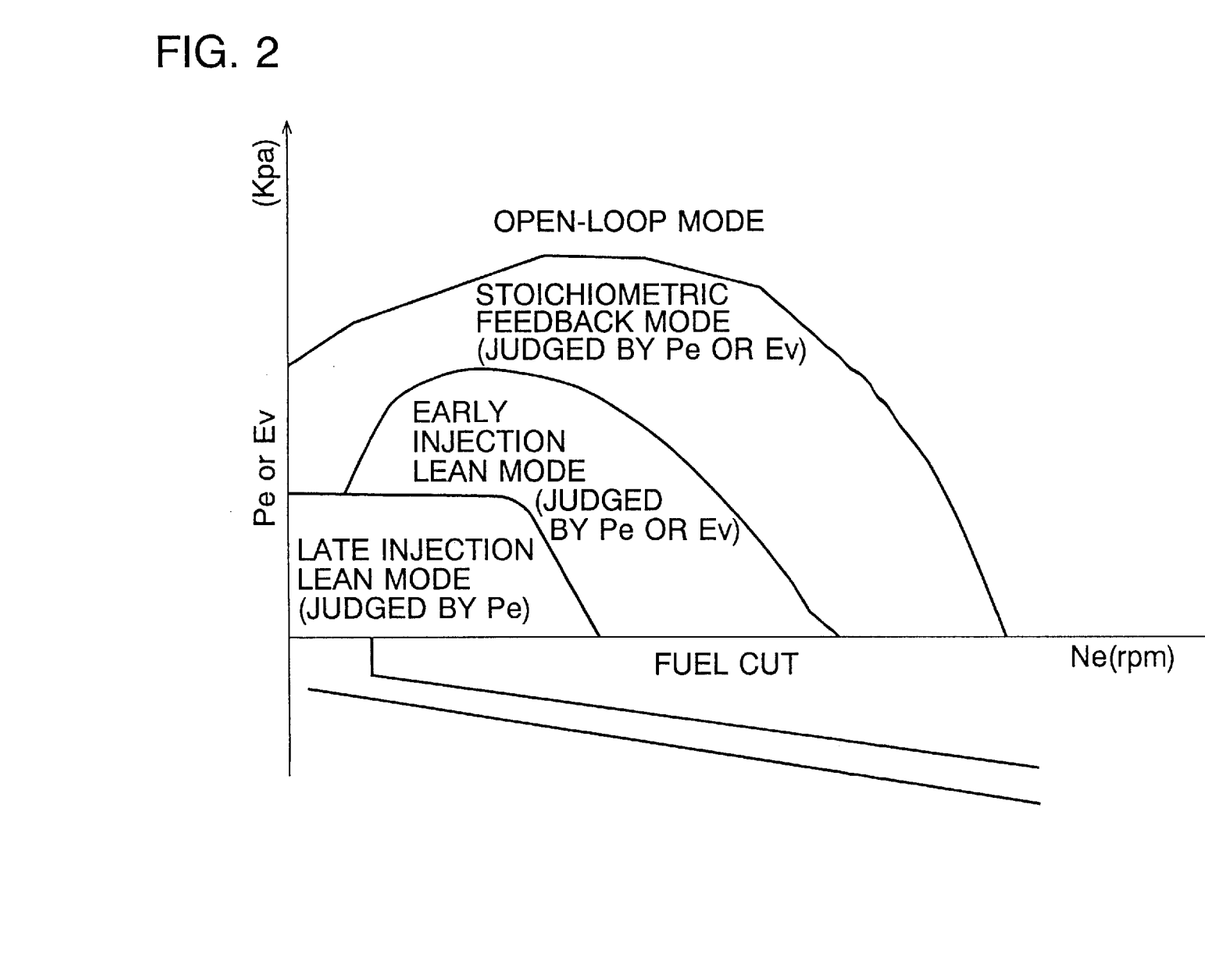
FIG. 2 is a diagram showing a judgment map of fuel injection mode.

When the engine 1 reaches a warming-up state, the ECU 70 retrieves a fuel injection mode region from the fuel injection control map shown in FIG. 2 in accordance with a target mean effective pressure Pe, which is obtained from the throttle opening information $\theta_{th}$ based on the throttle voltage $V_{th}$ from the TPS 29, or a volume efficiency Ev calculated on the basis of the intake air quantity Qa from the air flow sensor 32, and the engine speed Ne. Thereby, the fuel injection mode is set. Thereupon, the fuel injection quantity is settled in accordance with this fuel injection mode, and the fuel injection valve 4 is drivingly controlled. At the same time, the valve opening control for #2 ABV 27 and the EGR valve 45 is also carried out.

When the engine 1 is in a low-load, low-speed region, for example, as in an idle operation mode or low-speed drive mode, the fuel injection mode is set to be a late injection lean mode in accordance with FIG. 2, and fuel injection is effected in the compression stroke. Also, the fuel injection quantity is settled so that a lean target air-fuel ratio, that is, a target A/F (for example, A/F is about 30 to 40) is achieved on the basis of the target mean effective pressure Pe. At the same time, the ignition timing Sa and EGR quantity Legr are set, by which satisfactory combustion control is carried out.

The following is a description of the combustion in the late injection lean mode. In the cylinder-injection engine 1, the cavity 8 is formed on the top of the piston 7 as described above. Thereupon, the intake air flow flowing through the intake port 13 forms the aforesaid tumble flow along the cavity 8, so that a mixture of the fuel injected from the fuel injection valve 4 and the intake air, that is, the fuel spray is collected in the vicinity of the spark plug 3 in a good manner. As a result, a mixture near the stoichiometric air-fuel ratio AFs is always formed in a layer form surrounding the spark plug 3 at the time of ignition. Therefore, in this late injection mode, a high ignition property is secured even if the air-fuel ratio is lean as a whole.

Also, when the engine 1 is in a medium-load region, for example, as in a constant speed drive mode, the fuel injection mode is set to an early injection lean mode or stoichiometric feedback mode in accordance with FIG. 2. In the early injection lean mode and the stoichiometric feedback mode, fuel injection is effected in the intake stroke.

In the early injection lean mode, the fuel injection quantity is settled so that a lean target A/F (for example, A/F is about 20 to 30) is achieved on the basis of the volume efficiency Ev in place of the target mean effective pressure Pe. At the same time, the ignition timing Sa and EGR quantity Legr are set on the basis of the volume efficiency Ev, by which satisfactory combustion control is carried out.

On the other hand, in the stoichiometric feedback mode, although the ignition timing Sa and EGR quantity Legr are set on the basis of the volume efficiency Ev, the air-fuel ratio feedback control is carried out in accordance with the output voltage of the $O_2$ sensor 40, and the target A/F is controlled so as to be the stoichiometric air-fuel ratio AFs.

Also, when the engine 1 is in a high-load region, for example, in a sudden acceleration mode or high-speed drive mode, the fuel injection mode is set to an open-loop mode in accordance with FIG. 2. In this case, the early injection mode is selected so that fuel injection is effected in the intake stroke, and the target A/F is set so that a relatively rich air-fuel ratio is achieved on the basis of the volume efficiency Ev in the same manner as described above. Further, the ignition timing Sa and EGR quantity Legr are set, by which satisfactory combustion control is carried out.

When the vehicle is coasting in a medium- or high-speed drive mode, the fuel injection mode is set to a fuel cut mode as shown in FIG. 2. In this case, fuel injection is stopped. The fuel cut operation is suspended immediately when the engine speed Ne falls below the return speed or when the driver steps on the accelerator pedal.

When the engine 1 is in the idle operation mode, in order to stabilize the idle operation, the idle speed must be controlled in accordance with the increase or decrease in load of accessories such as an air conditioner, as with the case of the manifold-injection engine. In this case, as described above, when the engine 1 is in a warming-up state and the fuel injection mode is the early injection mode, the fuel is injected in the intake stroke, so that the idle speed can be controlled as with the case of the manifold-injection engine.

Specifically, when an external load of the accessories such as an air conditioner is applied, in order to prevent the decrease in the engine speed Ne, the ECU 70 sets a target engine speed Ne (hereinafter referred to as target Ne), which is higher than the present actual engine speed Ne (hereinafter referred to as actual Ne), and, in order to compensate the rotational speed deviation (ΔNe' described later) of the actual Ne from the target Ne, mainly carries out the opening control of #1 ABV 24, that is, the valve position control in the early injection mode in accordance with the rotational speed deviation so as to correct the intake air quantity. Also, in order to satisfactorily stabilize the idle speed, the advance angle correction or lag angle correction of ignition timing that can increase or decrease the engine output with high response is made temporarily immediately after the application or release of external load. Thereby, although the control response is usually poor because of intake delay in the increase/decrease correction of the intake air quantity, the idle speed, that is, the actual Ne is made to rapidly follow the target Ne by making the correction of ignition timing, so that a good idle operation state can be maintained despite of the application of external load.

On the other hand, even when the engine 1 is in a warming-up state and the fuel injection mode is the late injection mode, the valve position control of #1 ABV 24 is mainly carried out to correct the intake air quantity in the same manner as described above if a variation in engine speed Ne is predicted by the application of external load, etc. and the target Ne is set. However, in the late injection mode, as described above, ignition is effected when the fuel spray is satisfactorily collected in the vicinity of the spark plug 3, thereby achieving good combustion (MBT setting). Accordingly, if the correction of ignition timing is made rashly in the late injection mode, there is a possibility of deteriorated combustion, and therefore, it is said to be difficult to correct the ignition timing according to the application or release of external load in the late ignition mode.

Thus, in the case where the fuel injection mode is the late injection mode, the idle speed cannot be controlled with high response when an external load is applied. On the other hand, in the late injection mode, the engine output, that is, the engine speed Ne can be controlled with very high response if the fuel injection quantity is adjusted. That is to say, by injecting the fuel directly into the cylinder, the engine output control with high response and accuracy can be carried out because all of the supplied fuel is burned. In the late injection mode, therefore, by making the correction of fuel injection quantity in place of the correction of ignition timing, the idle speed is controlled with high response. The following is a description of the control procedure for the idle speed in the late injection mode.

Figure 3:
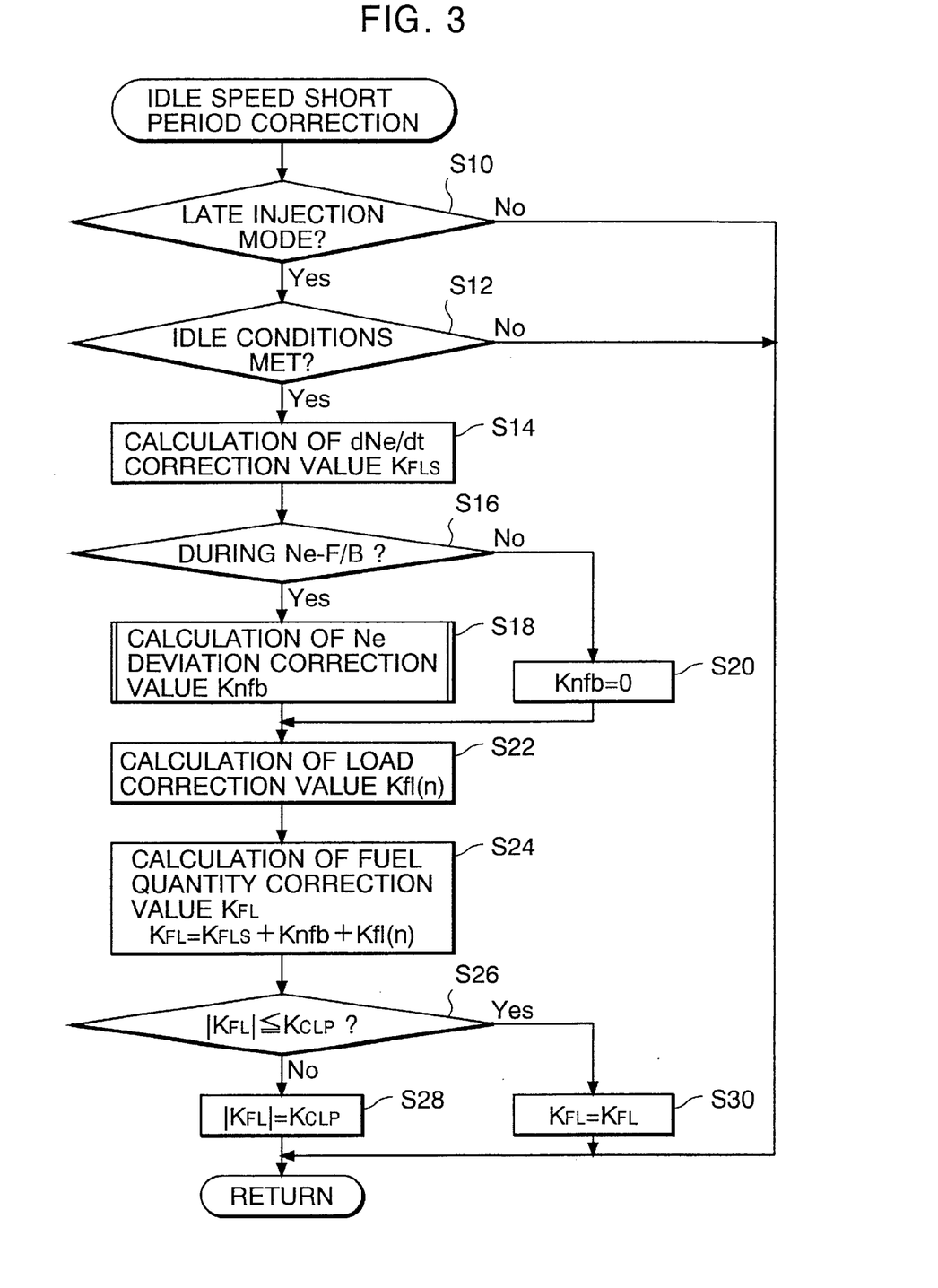
FIG. 3 is a flowchart showing an idle speed short period correction routine for making fuel correction during idle operation in a late injection mode.
Figure 4:
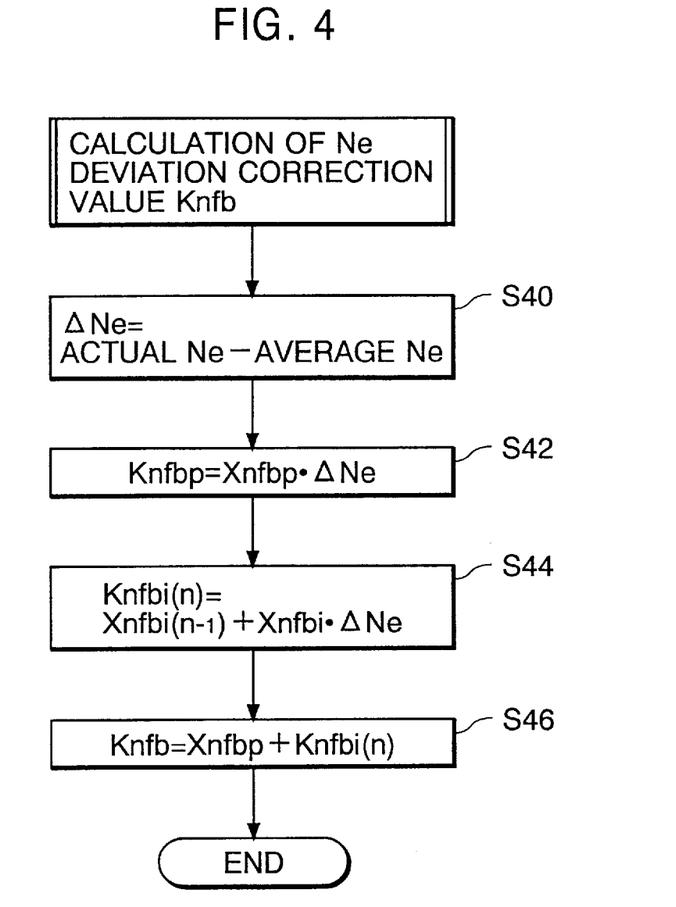
FIG. 4 is a flowchart showing a subroutine for calculating Ne deviation correction value $K_{nfb}$ in FIG. 3.
Figure 5:
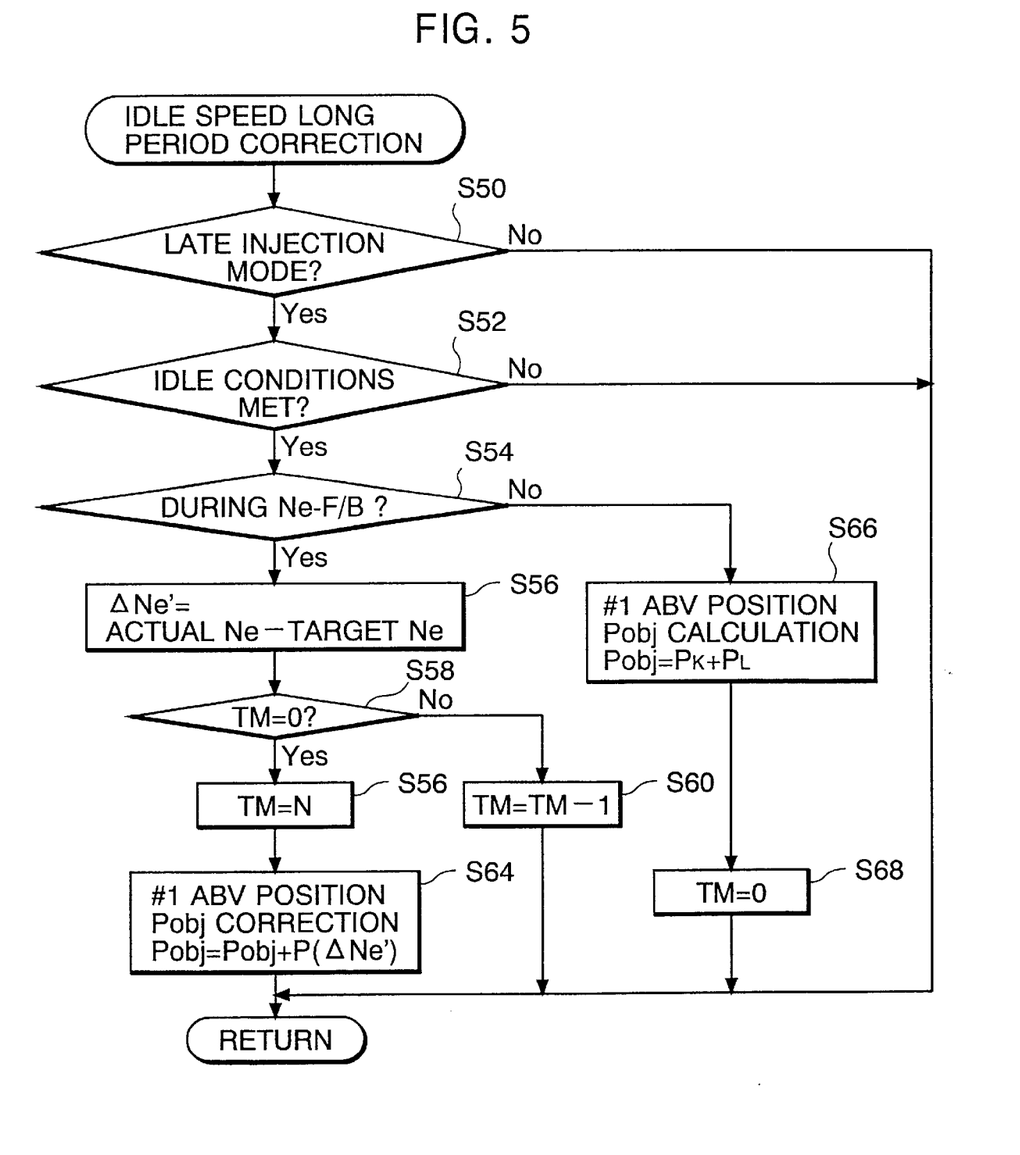
FIG. 5 is a flowchart showing an idle speed long period correction routine for making intake air correction during idle operation in a late injection mode.

Referring now to FIGS. 3 to 5, there are shown flowcharts for idle speed correction control routine in the case where the engine 1 is in a warming-up state and the fuel injection mode is the late injection mode (idle speed control means). FIGS. 3 and 4 are flowcharts for an idle speed short period correction routine capable of correcting the idle speed with high response while updating the correction amount of fuel injection quantity with a short period (for each fuel injection), that is, for the fuel correction control (fuel injection quantity correction means). FIG. 5 is a flowchart for an idle speed long period correction for making the correction of intake air quantity by controlling the valve position of #1 ABV 24, that is, for the intake air correction control (intake air quantity correction means). The reason why the intake air correction is made by the idle speed long period correction is because there is a possibility that the intake air quantity diverges if the correction is made with the same period as that of the fuel injection quantity since the intake air quantity has a response delay in increasing and decreasing. Therefore, the intake air correction is made by updating the correction amount of intake air quantity with a longer period than the correction amount of fuel injection quantity. The correction of fuel injection quantity (hereinafter referred to as fuel correction) in the late injection mode and the correction of intake air quantity (hereinafter referred to as intake air correction) by the valve position control of #1 ABV 24 will be described with reference to FIGS. 3 to 5.

First, the fuel correction will be described.

In this fuel correction, the fuel quantity is corrected in accordance with a load correction by the application of external load of accessories such as an air conditioner (see Step S22 in FIG. 3), a dNe/dt correction by the change rate dNe/dt of the actual Ne changed by the load correction (see Step S14 in FIG. 3), and an Ne deviation correction by the engine speed deviation ΔNe of the actual Ne from the mean engine speed (hereinafter referred to as average Ne) (see Step S18 in FIG. 3). Specifically, correction values $K_{fl(n)}$, $K_{FLS}$ and $K_{nfb}$ are set for each correction of load correction, dNe/dt correction, and Ne deviation correction, and the fuel injection quantity is corrected on the basis of the fuel correction value $K_{FL}$ that is the total value of these correction values. Thereby, the actual Ne follows the target value Ne with high response, and the idle speed is controlled properly.

Figure 6:
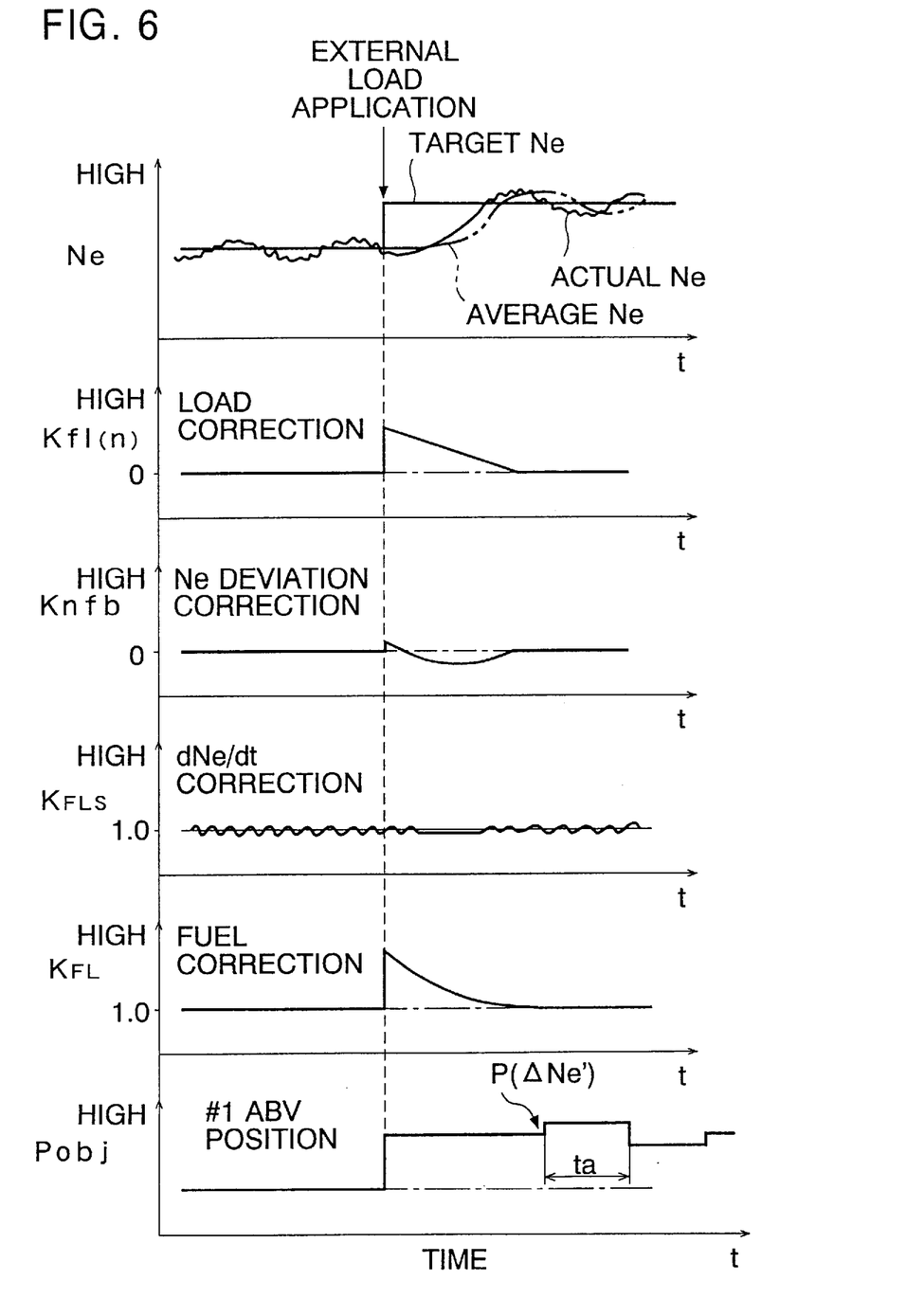
FIG. 6 is a time chart showing time-related changes in actual Ne, average Ne and target Ne, external load correction value $K_{fl(n)}$, Ne deviation correction value $K_{nfb}$, dNe/dt correction value $K_{FLS}$, fuel correction value $K_{FL}$, and valve position $P_{obj}$ of #1 ABV when an external load is applied in a late injection mode.

Referring now to FIG. 6, FIG. 6 shows time-related changes in actual Ne, average Ne and target Ne, when an external load is applied in a late injection mode, shows time-related change in external load correction value $K_{fl(n)}$ in accordance with the application of external load, shows time-related change in Ne deviation correction value $K_{nfb}$ in accordance with the engine speed deviation ΔNe, shows time-related change in dNe/dt correction value $K_{FLS}$ in accordance with the change rate dNe/dt, and shows time-related change in the total value of these correction values, that is, fuel correction value $K_{FL}$. Here, the fuel correction will be described with reference to FIG. 6.

First, in Step S10 in FIG. 3, it is determined whether or not the fuel injection mode is the late injection mode. If the determination result is No and the fuel injection mode is not the late injection mode, nothing is done and the program exits this routine. On the other hand, if the determination result is Yes, the program advances to the next Step S12.

In Step S12, it is determined whether or not the idle conditions are met and the engine 1 is in an idle operation state. Here, it is determined whether or not the throttle valve 28 is fully closed with the vehicle being stopped and the idle switch 30 being ON. Whether the vehicle is stopped or not is judged from whether the vehicle speed information V from the vehicle speed sensor 72 is 0 km/h or not.

If the determination result of Step S12 is No, nothing is done and the program exits this routine. On the other hand, the determination result of Step S12 is Yes, it can be judged that the engine 1 is in an idle operation state, and the program advances to Step S14.

In Step S14, dNe/dt correction is first made. That is, as described above, the dNe/dt correction value $K_{FLS}$ in accordance with the change rate dNe/dt of actual Ne is calculated.

Here, the change rate dNe/dt is first calculated from the following equation (1).

$$dNe/dt = Ne(n) - Ne(n-1) \qquad (1)$$

where Ne(n) is the present actual Ne, and Ne(n−1) is the actual Ne before unit time.

Then, the dNe/dt correction value $K_{FLS}$ is calculated from the following equation (2).

$$K_{FLS} = 1.0 + X_{FIDL} \cdot dNe/dt \qquad (2)$$

where $X_{FIDL}$ is a coefficient set beforehand for the dNe/dt correction.

Thus, the dNe/dt correction value $K_{FLS}$ is calculated. The dNe/dt correction based on this dNe/dt correction value $K_{FLS}$ is effective for a small engine speed change. Specifically, although the actual Ne fluctuates slightly as shown in FIG. 6, the dNe/dt correction value $K_{FLS}$ fluctuates slightly in the vicinity of the reference value 1.0 in accordance with the slight fluctuation in the actual Ne so as to cancel the fluctuation in the actual Ne. Therefore, the fuel injection quantity is always corrected quickly, so that the slight fluctuation in the actual Ne is properly kept without further increasing.

After the dNe/dt correction value $K_{FLS}$ has been calculated, it is determined in the next Step S16 whether the engine speed Ne feedback (Ne–F/B) is being effected without load change etc. at the present time. If the determination result is Yes, and it is judged that the Ne–F/B is being effected at present, the program advances to the next Step S18.

In Step S18, the Ne deviation correction is made. Specifically, as described above, the Ne deviation correction value $K_{nfb}$ in accordance with the engine speed deviation $\Delta Ne$ is calculated.

Here, the Ne deviation correction value $K_{nfb}$ calculation routine shown in FIG. 4 is executed.

In Step S40 in FIG. 4, the rotational speed deviation $\Delta Ne$ of the actual Ne from the average Ne is first determined from the following equation (3).

$$\Delta Ne = \text{actual } Ne - \text{average } Ne \qquad (3)$$

The average Ne is calculated from the following equation (4).

$$\text{average } Ne = \text{average } Ne(n) = \text{average } Ne(n-1) \cdot (1-K) + \text{actual } Ne \cdot K \quad (4)$$

where average Ne(n) indicates the present average Ne, and average Ne(n−1) indicates the previously calculated average Ne. Also, K is a coefficient (K<1).

In the next Step S42, the proportional correction component $K_{nfbp}$ of the Ne deviation correction value $K_{nfb}$ based on the rotational speed deviation $\Delta Ne$ is determined from the following equation (5).

$$K_{nfbp} = X_{nfbp} \cdot \Delta Ne \qquad (5)$$

where $X_{nfbp}$ is a coefficient set beforehand for the correction by the proportional correction component $K_{nfbp}$.

Next, in Step S44, the integral correction component $K_{nfbi(n)}$ of the Ne deviation correction value $K_{nfb}$ based on the rotational speed deviation $\Delta Ne$ is determined.

$$K_{nfbi(n)} = K_{nfbi(n-1)} + X_{nfbi} \cdot \Delta Ne \qquad (6)$$

where $X_{nfbi}$ is a coefficient set beforehand for the correction by the integral correction component $K_{nfbi(n)}$.

Then, in Step S46, based on the proportional correction component $K_{nfbp}$ and integral correction component $K_{nfbi(n)}$, the Ne deviation correction value $K_{nfb}$ is determined from the following equation (7).

$$K_{nfb} = K_{nfbp} + K_{nfbi(n)} \qquad (7)$$

The Ne deviation correction value $K_{nfb}$ thus calculated changes in the vicinity of 0 value, which is the reference value, for example, as shown in FIG. 6 when an external load is applied.

This Ne deviation correction has an effect that when the actual Ne changes greatly, the original, proper idle speed can be restored quickly.

Although the Ne deviation correction value $K_{nfb}$ has been determined on the basis of the rotational speed deviation $\Delta Ne$ of the actual Ne from the average Ne in the above description, the Ne deviation correction value $K_{nfb}$ can be determined on the basis of the later-described rotational speed deviation $\Delta Ne'$ of the actual Ne from the average Ne, with substantially the same effect.

On the other hand, returning to FIG. 3, if the determination result of Step S16 is No, that is, if the load is changed by the application of external load etc. and the Ne–F/B is not being effected at present, the program goes to Step S20, where the Ne deviation correction value $K_{nfb}$ is set at the reference value 0. That is to say, when the Ne–F/B is not being effected, the correction according to the engine speed deviation $\Delta Ne$ need not be made because the target Ne changes.

After the Ne deviation correction value $K_{nfb}$ has been set, the program advances to the following Step S22.

In Step S22, the load correction is made. Specifically, as described above, the external load correction value $K_{fl(n)}$ according to the application of external load is calculated.

The following is a description of the external load. Accessories producing an external load includes a power steering, alternator, etc. as well as the aforesaid air conditioner. Therefore, the external load is applied in accordance with these ON signals, by which the target Ne is increased. On the other hand, the increased target Ne is decreased by the release of the external load in accordance with the OFF signal. An external load is produced by the switching between D (drive) range and N (neutral) range of an automatic transmission.

The external load correction value $K_{fl(n)}$ is calculated from the following equations (8) and (9).

$$K_{fl(1)} = K_{flc} \qquad (8)$$

$$K_{fl(n)} = K_{fl(n-1)} \cdot K_{flt} \qquad (9)$$

where $K_{flc}$ is a correction initial value set beforehand for each application of external load, and $K_{flt}$ is a tailing coefficient ($K_{flt} < 1.0$).

That is to say, when an external load is applied, the external load correction value $K_{fl(n)}$ is once made the correction initial value $K_{flc}$, and then is decreased with time by the tailing coefficient $K_{flt}$ (<1.0) as shown in FIG. 6.

After the dNe/dt correction value $K_{FLS}$, Ne deviation correction value $K_{nfb}$, and external load correction value $K_{fl(n)}$ have been set as described above, these correction values are summed up by the following equation (10), by which the fuel correction value (total value) $K_{FL}$ is finally determined.

$$K_{FL} = K_{FLS} + K_{nfb} + K_{fl(n)} \qquad (10)$$

In the next Step S26, it is determined whether or not the absolute value of the fuel correction value $K_{FL}$ is not higher than a predetermined clip value $K_{CLP}$. The clip value $K_{CLP}$ is provided to prevent the fact that the fuel correction value $K_{FL}$ becomes too large on the positive or negative side and the fuel quantity changes too greatly, and the actual air-fuel ratio, that is, the actual A/F becomes too rich or too lean, so that the combustion state is deteriorated.

If the determination result of Step S26 is Yes and the absolute value of the fuel correction value $K_{FL}$ is not higher than a predetermined clip value $K_{CLP}$ ($|K_{FL}| \leq K_{CLP}$), the program goes to Step S30, where fuel correction value $K_{FL}$ is kept as it is ($K_{FL} = K_{FL}$). On the other hand, if the determination result of Step S26 is No and the absolute value of the fuel correction value $K_{FL}$ exceeds the clip value $K_{CLP}$ ($|K_{FL}| > K_{CLP}$), the deterioration in combustion state is predicted. The program advances to Step S28, where the absolute value of the fuel correction value $K_{FL}$ is set at the clip value $K_{CLP}$ ($|K_{FL}| = K_{CLP}$).

After the fuel correction value $K_{FL}$ has been set in this manner, the ECU 70 corrects the fuel injection time on the basis of the fuel correction value $K_{FL}$. Actually, the fuel injection time is corrected by adding the fuel correction value $K_{FL}$ to the fuel injection time. Thereby, the fuel injection quantity injected from the fuel injection valve 4 is adjusted properly.

By repeatedly executing this idle speed short period correction routine, the fuel correction value $K_{FL}$ is satisfactorily updated continuously with a short period for each execution period of that routine as shown in FIG. 6. As a result, as shown in FIG. 6, the actual Ne follows the target Ne with high response. Therefore, even if an external load etc. is applied, the idle speed according to the applied external load is secured rapidly.

As described above, the fuel correction value $K_{FL}$ is set as the sum of the dNe/dt correction value $K_{FLS}$, the Ne deviation correction value $K_{nfb}$, and the external load correction value $K_{fl(n)}$. Therefore, as shown in FIG. 6, the slope of the fuel correction value $K_{FL}$ becomes gentle as the actual Ne approaches the target Ne. That is to say, the fuel quantity, which is greatly increased once by making the external load correction value $K_{fl(n)}$ the correction initial value $K_{flc}$, is further decreased by the Ne deviation correction value $K_{nfb}$ with time in addition to the tailing of external load correction value $K_{fl(n)}$. Thereby, the fuel quantity is returned to the state before increasing with a gentle decrease curve. Therefore, by using the fuel correction value $K_{FL}$, the actual Ne converges to the target Ne satisfactorily without great overshoot or undershoot.

The following is a description of the intake air correction.

In Step S50 in FIG. 5, as with the case of the fuel correction, it is determined whether or not the fuel injection mode is the late injection mode. In Step S52, it is similarly determined whether or not the idle operation conditions are met.

If both of the determination results of Steps S50 and S52 are Yes, the program advances to the next Step S54.

In Step S54, as with the case of Step S16 in FIG. 3, it is determined whether or not the Ne-F/B is being effected at the present time. If the determination result is Yes and it is judged that the Ne-F/B is now being effected without load change etc., the program advances to the next Step S56.

In Step S56, the rotational speed deviation $\Delta Ne'$ of the actual Ne from the target Ne is calculated from the following equation (11).

$$\Delta Ne' = \text{actual } Ne - \text{target } Ne \tag{11}$$

In Step S58, it is determined whether or not the value of timer TM, which is set at the initial value N in the next Step S62, is 0.

Just after the determination result of Step S54 is judged to be Yes, as described later, the value of timer TM is set at the initial value 0, so that the determination result is Yes, and the program advances to the next Step S62.

In Step S62, the timer TM is set at the value N. This value N is a value corresponding to a predetermined time $t_a$ (for example, 1 sec). Specifically, the value N is set so that the product of the execution period $T_c$ of that routine and the value N is the predetermined time $t_a$ (for example, 1 sec) ($T_c \cdot N = t_a$).

In the next Step S64, the correction of valve position $P_{obj}$ of #1 ABV 24 is made according to the following equation (12).

$$P_{obj} = P_{obj} + P(\Delta Ne') \tag{12}$$

where $P(\Delta Ne')$ is the correction value of valve position $P_{obj}$. This correction value $P(\Delta Ne')$ is set in accordance with the aforesaid $\Delta Ne'$.

This routine is executed repeatedly. When Step S58 is executed at the next time, the timer TM is not the value 0, so that the determination result is No. In this case, the program goes to Step S60, where the timer TM is counted down (TM=TM-1).

When the count down in Step S60 proceeds and the value of timer TM becomes 0, Step S64 is executed again through Step S62.

The intake air correction based on the correction value $P(\Delta Ne')$ of valve position $P_{obj}$ in Step S64 is made each time the timer TM is counted down and becomes the value 0, that is, with the period $t_a$, which is relatively long. Therefore, as shown in FIG. 6, the valve position $P_{obj}$ is corrected stepwise with the period $t_a$, finally becoming a proper value according to the target Ne, except for the period of time when an external load is applied and the load changes.

On the other hand, if the determination result of Step S54 is No and it is judged that the idle speed control is not in Ne-F/B mode, the program goes to Step S66.

In Step S66, the valve position $P_{obj}$ of #1 ABV 24 is calculated from the following equation (13).

$$P_{obj} = P_K + P_L \tag{13}$$

where $P_K$ is the reference valve position of #1 ABV 24 corresponding to the target Ne, and $P_L$ is a learning value set on the basis of the learning control for idle stabilization, though the detailed explanation thereof is omitted here.

That is to say, if the idle speed control is not in Ne-F/B mode, the position $P_{obj}$ of #1 ABV 24 is set at a value based on the reference valve position $P_K$ and the learning value $P_L$, by which the idle speed is maintained in a state stabilized on the basis of the learning value $P_L$.

FIG. 6 also shows the change in valve position $P_{obj}$ in the case where an external load is applied, that is, the Ne-F/B is not being effected. When the Ne-F/B is not effected at the present time, the valve position $P_{obj}$ is increased by an amount corresponding to, for example, the application of external load, and then is kept substantially constant.

After Step S66 is executed, in Step S68, the timer TM is reset to the initial value 0 for the preparation for the time when it is judged that the idle speed control is in Ne-F/B mode at the next time.

Thus, the fuel correction and the intake air correction are made. The following is a description of the relationship between the fuel correction and the intake air correction.

As described above, for example, when an external load is applied, the fuel correction is first made on the basis of the fuel correction value $K_{FL}$. This fuel correction value $K_{FL}$ decreases gradually as shown in FIG. 6, by which the fuel correction proceeds to completion. As is apparent from FIG. 6, while the fuel correction value $K_{FL}$ decreases, the intake air correction by the valve position $P_{obj}$ is made with response delay. That is to say, the intake air correction is made so as to follow the fuel correction and succeed it.

Thereupon, although the actual Ne is changed to the target Ne at the time when the fuel correction is completed, this actual Ne is satisfactorily kept at the target Ne by the fact that the engine output is kept substantially constant by the execution of fuel correction and intake air correction. Therefore, even when an external load is applied during idle operation, the idle speed corresponds to the external load with high response, and is satisfactorily kept in a stable state without uneven rotation.

In Step S64 in FIG. 5, the valve position $P_{obj}$ is updated for each period $t_a$ using the correction value $P(\Delta Ne')$, that is, the correction value according to the rotational speed deviation $\Delta Ne'$ of the actual Ne from the target Ne. However, a correction value $P(K_{FL})$ that is set according to the fuel correction value $K_{FL}$ may be used as this correction value.

Figure 7:
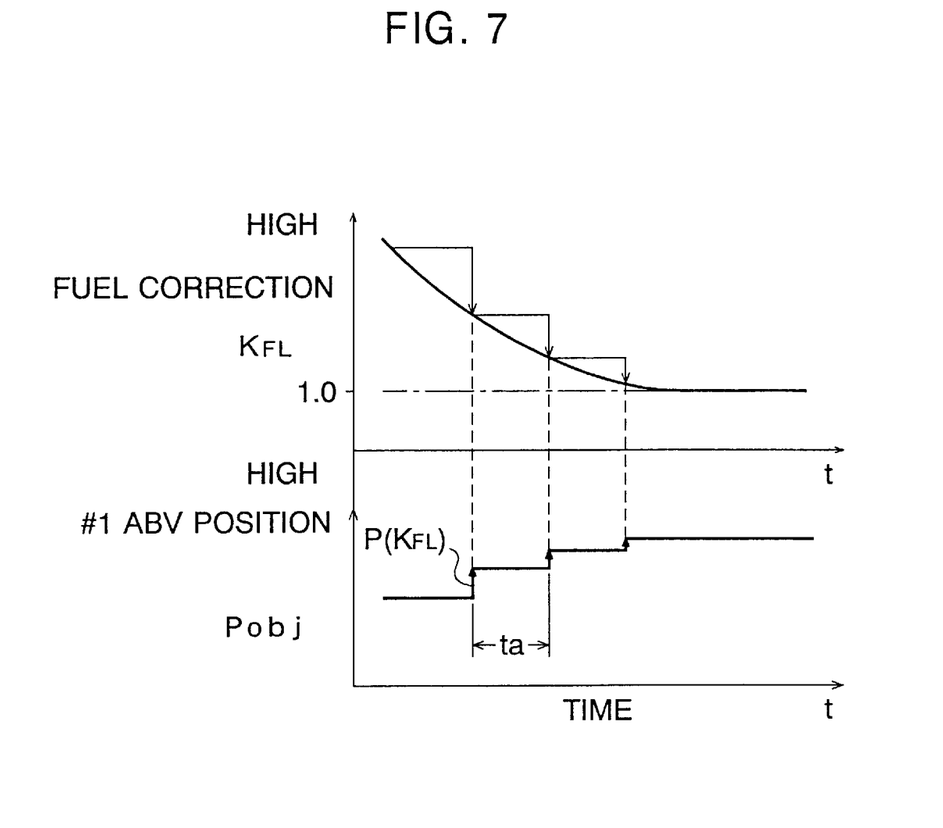
FIG. 7 is a time chart schematically showing the relationship between the fuel correction value $K_{FL}$ and the valve position $P_{obj}$ of #1 ABV and correction value $P(K_{FL})$ when the correction value of valve position $P_{obj}$ of #1 ABV is taken as the correction value $P(K_{FL})$.

FIG. 7 schematically shows the relationship between the fuel correction value $K_{FL}$ and the valve position $P_{obj}$ of #1 ABV 24 when the correction value $P(K_{FL})$ is used. When correction is made by using the fuel correction value $K_{FL}$, the correction value $P(K_{FL})$ may be changed stepwise according to the change amount of the fuel correction value $K_{FL}$ for each period $t_a$ (for example, 1 sec). Here, the correction value $P(K_{FL})$ is set so that for example, the change amount of 3% of the fuel correction value $K_{FL}$ corresponds to one step change of the correction value $P(K_{FL})$ (correction amount replacement means).

Thus, by using the correction value $P(K_{FL})$ according to the change amount of the fuel correction value $K_{FL}$, the fuel correction and the intake air correction have a close relationship, by which the idle speed control is made more suitable. When the intake air correction is made on the basis of the correction value $P(\Delta Ne')$, the intake air correction is made substantially independently of the fuel correction. Because the position $P_{obj}$ of #1 ABV 24 is set in accordance with the change amount of the fuel correction value $K_{FL}$, the correction amount by the fuel correction can be replaced suitably with the correction amount by the intake air correction. Therefore, combustion with a stable air-fuel ratio is achieved, so that the idle speed becomes more stable.

As explained in detail above, in the control apparatus for a cylinder-injection spark-ignition internal combustion engine in accordance with the present invention, in the case where the fuel injection mode is the late injection mode and the engine is in the idle operation state, when an external load is applied or released by, for example, the activation or deactivation of an air conditioner, the target Ne is set so that the idle speed does not decrease or increase. And, in order to compensate the rotational speed deviation $\Delta Ne'$ of the actual Ne from the target Ne, the fuel correction with high response with a short period is made in addition to the intake air correction by #1 ABV 24 with low response. Therefore, even when an external load is applied during idle operation, the actual Ne can follow the target Ne very quickly and properly, so that a stable idle speed can be maintained without uneven rotation. For this reason, the ordinary idle speed can be kept low, by which the fuel efficiency can be improved.

In this embodiment, the fuel correction value $K_{FL}$ for making the fuel correction is set on the basis of the sum of the dNe/dt correction value $K_{FLS}$, the Ne deviation correction value $K_{nfb}$, and the external load correction value $K_{fl(n)}$. Therefore, by adjusting the external load correction value $K_{fl(n)}$ by the Ne deviation correction value $K_{nfb}$ and the dNe/dt correction value $K_{FLS}$, a gentle decrease curve as shown in FIG. 6 can be obtained. Thereby, the overshoot or undershoot of the actual Ne for the target Ne can be prevented properly, so that the idle speed can be made more stable.

For example, when the fuel correction is made, the correction amount for intake air correction, that is, the correction amount of the valve position $P_{obj}$ of #1 ABV 24 is made the correction value $P(K_{FL})$ according to the fuel correction value $K_{FL}$ used in fuel correction, by which the correction amount by the fuel correction can be replaced properly with the correction amount by the intake air correction. Therefore, combustion with a stable air-fuel ratio is enabled, and the idle speed can be made more stable. If the idle speed can be controlled with a stable air-fuel ratio in this manner, the deterioration in combustion can be inhibited, and troubles such as misfire and discharge of unburned gas can be prevented in the late injection mode.

In the above embodiment, the idle speed control (engine speed control) mainly when an external load is applied in the late injection mode has been explained. However, even when an external load is released, the actual Ne likewise follows the target Ne properly, so that a stable idle speed is maintained. In this case, unlike the case where an external load is applied, the fuel injection quantity is corrected so as to decrease.

Also, in the above embodiment, the fuel correction is made by taking the sum of the dNe/dt correction value $K_{FLS}$, the Ne deviation correction value $K_{nfb}$, and the external load correction value $K_{fl(n)}$ as the fuel correction value $K_{FL}$, that is, the fuel correction is made by all of the dNe/dt correction, Ne deviation correction, and external load correction mainly in the idle speed control. However, when the engine speed Ne changes, even if only any one of the dNe/dt correction, Ne deviation correction, and external load correction is made, the idle speed can be stabilized with high response.

What is claimed is:

1. A control apparatus for a cylinder-injection spark-ignition internal combustion engine, in which said internal combustion engine, having a fuel injection valve for directly injecting fuel to a combustion chamber, controls said fuel injection valve on the basis of either of injection modes of an intake stroke injection mode for effecting fuel injection mainly in the intake stroke and a compression stroke injection mode for effecting fuel injection mainly in the compression stroke, said control apparatus comprising:
   operation state detecting means for detecting the operation state of said internal combustion engine;
   injection mode selecting means for selecting said intake stroke injection mode or compression stroke injection mode in accordance with the operation state detected by said operation state detecting means;
   fuel injection quantity correction means for correcting at least the fuel injection quantity supplied to said combustion chamber so that the preset target idle speed is reached when an idle operation state is detected by said operation state detecting means;
   intake air quantity correction means for correcting the intake air quantity supplied to said combustion chamber so that the preset target idle speed is reached when an idle operation state is detected by said operation state detecting means; and
   idle speed control means for controlling the idle speed on the basis of each correction amount corrected by said fuel injection quantity correction means and intake air quantity correction means when an idle operation state is detected by said operation state detecting means and said compression stroke injection mode is selected by said injection mode selecting means.

2. The control apparatus according to claim 1, wherein the control period based on said fuel injection quantity correction means is set so as to be shorter than the control period based on said intake air quantity correction means.

3. The control apparatus according to claim 1, wherein said fuel injection quantity correction means corrects said fuel injection quantity on the basis of at least one of the external load operation state, engine speed deviation from said target idle speed or average engine speed, and engine speed change rate.

4. The control apparatus according to claim 1, wherein said fuel injection quantity correction means corrects said fuel injection quantity on the basis of the sum of correction amounts determined from the external load operation state, engine speed deviation from said target idle speed or average engine speed, and engine speed change rate.

5. The control apparatus according to claim 4, wherein said fuel injection quantity correction means regulates the corrected fuel injection quantity corrected on the basis of the sum of said correction amounts so as to be not larger than a predetermined value that does not exceed the combustion stability limit of said compression stroke injection mode.

6. The control apparatus according to claim 4, wherein said intake air quantity correction means sets the correction amount of said intake air quantity on the basis of the engine speed deviation from said target idle speed.

7. The control apparatus according to claim 4, wherein said intake air quantity correction means includes correction replacement means for setting the correction amount of said intake air quantity on the basis of the corrected fuel injection quantity which is set by said fuel injection quantity correction means.

8. The control apparatus according to claim 1, wherein said control apparatus further comprises rotational speed detecting means for detecting the engine speed of said internal combustion engine, and said fuel injection quantity correction means includes first correction value setting means which determines the engine speed change rate from the actual engine speed detected with each predetermined period by said rotational speed detecting means and calculates the change rate correction amount on the basis of said engine speed change rate, and second correction value setting means which determines the engine speed deviation from said target idle speed or average engine speed and the actual engine speed detected by said rotational speed detecting means and calculates the deviation correction amount on the basis of said engine speed deviation.

9. The control apparatus according to claim 8, wherein said control apparatus further comprises:

load operation detecting means for detecting the operation state of an external load connected to a rotating shaft including at least an output shaft of said internal combustion engine; and target idle speed correction means for correcting said target idle speed in accordance with the external load when a change in operation state of external load is detected by said load operation detecting means, said fuel injection quantity correction means includes third correction value setting means which calculates the external load correction amount in accordance with the external load whose change in operation state is detected by said load operation detecting means, and said second correction value setting means determines the engine speed deviation from said target idle speed corrected by said target idle speed correction means or average engine speed and the actual engine speed detected by said rotational speed detecting means, and calculates the deviation correction amount on the basis of said engine speed deviation.

10. The control apparatus according to claim 9, wherein said second correction value setting means sets said deviation correction amount at zero when the change in operation state of external load is detected by said load operation detecting means.

11. The control apparatus according to claim 9, wherein said third correction value setting means sets said external load correction amount so as to be a correction initial value preset in accordance with the external load when the change in operation state of external load is detected by said load operation detecting means.

12. The control apparatus according to claim 11, wherein said third correction value setting means sets said external load correction amount so as to decrease with time after said external load correction amount is once set at said correction initial value.

13. The control apparatus according to claim 9, wherein said intake air quantity correction means includes fourth correction value setting means which calculates the corrected intake air quantity on the basis of the engine speed deviation determined from said target idle speed corrected by said target idle speed correction means and the actual engine speed detected by said rotational speed detecting means.

14. The control apparatus according to claim 13, wherein said intake air quantity correction means updates said corrected intake air quantity calculated by said fourth correction value setting means after a predetermined period of time elapses, and sets it as a new corrected intake air quantity.

15. The control apparatus according to claim 9, wherein said control apparatus further comprises rotational speed detecting means for detecting the engine speed of said internal combustion engine, and said intake air quantity correction means includes fourth correction value setting means which calculates the corrected intake air quantity on the basis of the engine speed deviation determined from said target idle speed and the actual engine speed detected by said rotational speed detecting means.

16. The control apparatus according to claim 15, wherein said intake air quantity correction means updates said corrected intake air quantity calculated by said fourth correction value setting means after a predetermined period of time elapses, and sets it as a new corrected intake air quantity.

17. The control apparatus according to claim 15, wherein said control apparatus further comprises:

load operation detecting means for detecting the operation state of an external load connected to a rotating shaft including at least an output shaft of said internal combustion engine; and target idle speed correction means for correcting said target idle speed in accordance with the external load when a change in operation state of external load is detected by said load operation detecting means, and said fourth correction value setting means determines the engine speed deviation from said target idle speed corrected by said target idle speed correction means and the actual engine speed detected by said rotational speed detecting means, and calculates the corrected intake air quantity on the basis of said engine speed deviation.

18. The control apparatus according to claim 17, wherein said intake air quantity correction means includes fifth correction amount setting means which calculates the target intake air quantity corresponding to said target idle speed corrected by said target idle speed correction means when the change in operation state of external load is detected by said load operation detecting means.

19. The control apparatus according to claim 18, wherein said fifth correction amount setting means adds a learning value learned for stabilizing the idle speed to said target intake air quantity.

20. The control apparatus according to claim 1, wherein said control apparatus further comprises:

rotational speed detecting means for detecting the engine speed of said internal combustion engine;

load operation detecting means for detecting the operation state of an external load connected to a rotating shaft including at least an output shaft of said internal combustion engine; and target idle speed correction means for correcting said target idle speed in accordance with the external load when a change in operation state of external load is detected by said load operation detecting means, and said fuel injection quantity correction means includes first correction value setting means which determines the engine speed change rate from the actual engine speed detected with each predetermined period by said rotational speed detecting means and calculates the change rate correction amount on the basis of said engine speed change rate, second correction value setting means which determines the engine speed deviation from said target idle speed corrected by said target idle speed correction means or average engine speed and the actual engine speed detected by said rotational speed detecting means and calculates the deviation correction amount on the basis of said engine speed deviation, and third correction value setting means which calculates the external load correction amount in accordance with the external load whose change in operation state is detected by said load operation detecting means, and sets the corrected fuel injection quantity on the basis of the sum of the change rate correction amount, deviation correction amount, and external load correction amount.

21. The control apparatus according to claim 20, wherein said third correction value setting means sets said external load correction amount so as to be a correction initial value preset in accordance with the external load when the change in operation state of external load is detected by said load operation detecting means, and sets said external load correction amount so as to decrease with time after said external load correction amount is once set at said correction initial value.

22. The control apparatus according to claim 21, wherein said intake air quantity correction means includes fourth correction value setting means which determines the engine speed deviation from said target idle speed corrected by said target idle speed correction means and the actual engine speed detected by said rotational speed detecting means, and calculates the corrected intake air quantity on the basis of said engine speed deviation.

23. The control apparatus according to claim 22, wherein said intake air quantity correction means includes fifth correction amount setting means which calculates the target intake air quantity corresponding to said target idle speed corrected by said target idle speed correction means when the change in operation state of external load is detected by said load operation detecting means.

24. The control apparatus according to claim 23, wherein said idle speed control means once controls the idle speed on the basis of said corrected fuel injection quantity and target intake air quantity set by said fuel injection quantity correction means and intake air quantity correction means, respectively, when the change in operation state of external load is detected by said load operation detecting means.

25. The control apparatus according to claim 24, wherein said idle speed control means controls the idle speed on the basis of said corrected fuel injection quantity and corrected intake air quantity set by said fuel injection quantity correction means and intake air quantity correction means, respectively, after the idle speed is once controlled on the basis of said corrected fuel injection quantity and target intake air quantity.

26. The control apparatus according to claim 21, wherein said intake air quantity correction means includes correction replacement means for calculating the corrected intake air quantity on the basis of said corrected fuel injection quantity which is set by said fuel injection quantity correction means.

27. A control method for a cylinder-injection spark-ignition internal combustion engine, in which said internal combustion engine, having a fuel injection valve for directly injecting fuel to a combustion chamber, controls said fuel injection valve on the basis of either of injection modes of an intake stroke injection mode for effecting fuel injection mainly in the intake stroke and a compression stroke injection mode for effecting fuel injection mainly in the compression stroke, said control method comprising:
(a) detecting the operation state of said internal combustion engine;
(b) selecting said intake stroke injection mode or compression stroke injection mode in accordance with the operation state detected in said step (a);
(c) correcting the fuel injection quantity supplied to at least said combustion chamber so that the preset target idle speed is reached when an idle operation state is detected in said step (a);
(d) correcting the intake air quantity supplied to said combustion chamber so that the preset target idle speed is reached when an idle operation state is detected in said step (a); and
(e) controlling the idle speed on the basis of each correction amount corrected in said step (c) and step (d) when an idle operation state is detected in said step (a) and said compression stroke injection mode is selected in said step (b).

28. The control method according to claim 27, wherein said control method further comprises:
(f) detecting the engine speed of said internal combustion engine;
(g) detecting the operation state of an external load connected to a rotating shaft including at least an output shaft of said internal combustion engine; and
(h) correcting said target idle speed in accordance with the external load when a change in operation state of external load is detected in said step (g); and
said step (c) comprises:
(c1) determining the engine speed change rate from the actual engine speed detected with each predetermined period in said step (f) and calculating the change rate correction amount on the basis of said engine speed change rate;
(c2) determining the engine speed deviation from said target idle speed corrected in said step (h) or average engine speed and the actual engine speed detected in said step (f) and calculating the deviation correction amount on the basis of said engine speed deviation;
(c3) calculating the external load correction amount in accordance with the external load whose change in operation state is detected in said step (g); and
(c4) setting the corrected fuel injection quantity on the basis of the sum of the change rate correction amount calculated in step (c1), the deviation correction amount calculated in said step (c2), and the external load correction amount calculated in said step (c3).

29. The control method according to claim 28, wherein said step (c2) further comprises setting said deviation correction amount at zero when the change in operation state of external load is detected in said step (g).

30. The control method according to claim 28, wherein said step (c3) further comprises setting said external load correction amount so as to be a correction initial value preset in accordance with the external load when the change in operation state of external load is detected in said step (g), and setting said external load correction amount so as to decrease with time after said external load correction amount is once set at said correction initial value.

31. The control method according to claim 30, wherein said step (d) comprises:

(d1) determining the engine speed deviation from said target idle speed corrected in said step (h) and the actual engine speed detected in said step (f), and calculating the corrected intake air quantity on the basis of said engine speed deviation.

32. The control method according to claim 31, wherein said step (d) comprises:

(d2) calculating the target intake air quantity corresponding to said target idle speed corrected in said step (h) when the change in operation state of external load is detected in said step (g).

33. The control method according to claim 32, wherein said step (e) comprises:

(e1) controlling the idle speed once on the basis of said corrected fuel injection quantity and target intake air quantity set in said step (c) and step (d), respectively, when the change in operation state of external load is detected in said step (g).

34. The control method according to claim 33, wherein said step (e) comprises:

(e2) controlling the idle speed on the basis of said corrected fuel injection quantity and target intake air quantity set in said step (c) and step (d), respectively, after the idle speed is once controlled on the basis of said corrected fuel injection quantity and target intake air quantity.

35. The control method according to claim 34, wherein said step (e2) further comprises setting the control period based on said step (c) so as to be shorter than the control period based on said step (d).

36. The control method according to claim 32, wherein said step (d) comprises:

(d3) calculating the corrected intake air quantity on the basis of said corrected fuel injection quantity set in said step (c4).

* * * * *